(12) United States Patent
Johansson et al.

(10) Patent No.: US 10,257,772 B2
(45) Date of Patent: Apr. 9, 2019

(54) SYSTEM INFORMATION ACQUISITION

(71) Applicant: MEDIATEK INC., Hsinchu (TW)

(72) Inventors: Per Johan Mikael Johansson, Kungsangen (SE); Chia-Chun Hsu, New Taipei (TW); Guan-Yu Lin, Nantou County (TW)

(73) Assignee: MEDIATEK INC., HsinChu (TW)

( * ) Notice: Subject to any disclaimer, the term of this patent is extended or adjusted under 35 U.S.C. 154(b) by 20 days.

(21) Appl. No.: 15/674,518

(22) Filed: Aug. 11, 2017

(65) Prior Publication Data

US 2018/0049107 A1   Feb. 15, 2018

Related U.S. Application Data

(60) Provisional application No. 62/374,047, filed on Aug. 12, 2016.

(51) Int. Cl.
*H04W 4/00* (2018.01)
*H04W 48/10* (2009.01)
(Continued)

(52) U.S. Cl.
CPC .......... *H04W 48/10* (2013.01); *H04W 48/14* (2013.01); *H04W 72/005* (2013.01);
(Continued)

(58) Field of Classification Search
CPC ..... H04W 48/10; H04W 72/00; H04W 72/12; H04W 74/08; H04W 72/005;
(Continued)

(56) References Cited

U.S. PATENT DOCUMENTS

| 8,213,990 B2* | 7/2012 | Wu ...................... H04W 8/205 370/329 |
| 8,274,938 B2* | 9/2012 | Chang .................. H04W 8/183 370/329 |

(Continued)

FOREIGN PATENT DOCUMENTS

| CN | 103796225 A | 10/2012 |
| CN | 104349420 A | 7/2013 |

(Continued)

OTHER PUBLICATIONS

System information in NR; 3GPP TSG RAN WG2 Meeting #94, CATT, R2-163470, Nanjing, China, May 23-27, 2016.*

(Continued)

*Primary Examiner* — Mahendra Patel
(74) *Attorney, Agent, or Firm* — Imperium Patent Works; Zheng Jin

(57) ABSTRACT

A method of system information (SI) acquisition with reduced signaling overhead is proposed. To reduce SI broadcast overhead, the quantity of periodic SI broadcast and the frequency of on-demand SI acquisition need to be reduced. In order to reduce the quantity of periodic SI broadcasting, on-demand SI delivery is enabled. With on-demand SI delivery, signaling overhead is proportional to the frequency of SI acquisition. From the network side, the base stations proactively provide SI delivery options and delivers SI over unicast or scheduled broadcast. From the UE side, UE determines how to acquire SI, i.e., by listening to broadcast or by sending an on-demand request via existing procedures such as a random-access procedure over a random-access channel (RACH).

20 Claims, 4 Drawing Sheets

(51) Int. Cl.
*H04W 72/00* (2009.01)
*H04W 72/12* (2009.01)
*H04W 74/08* (2009.01)
*H04W 48/14* (2009.01)
*H04W 88/02* (2009.01)

(52) U.S. Cl.
CPC ....... *H04W 72/12* (2013.01); *H04W 74/0833* (2013.01); *H04W 88/02* (2013.01)

(58) Field of Classification Search
CPC . H04W 48/14; H04W 74/0833; H04W 88/02; H04B 1/38; H04L 29/06; H04M 1/7253; H04M 2250/02
USPC .................. 370/329, 328, 327; 455/558, 411
See application file for complete search history.

(56) References Cited

U.S. PATENT DOCUMENTS

| | | | | |
|---|---|---|---|---|
| 8,391,211 | B2* | 3/2013 | Huang ................ | H04L 12/4633 370/328 |
| 9,185,682 | B2* | 11/2015 | Hsu ....................... | H04W 72/00 |
| 9,357,476 | B2* | 5/2016 | Hegde ................... | H04W 48/16 |
| 2010/0184454 | A1* | 7/2010 | Luft ....................... | H04W 48/02 455/456.5 |
| 2013/0039309 | A1* | 2/2013 | Chiu ..................... | H04W 48/08 370/329 |
| 2014/0293860 | A1* | 10/2014 | Hegde ................... | H04W 4/06 370/312 |
| 2014/0293901 | A1* | 10/2014 | Hegde ................... | H04W 48/16 370/329 |
| 2014/0335867 | A1* | 11/2014 | Hsu ...................... | H04W 52/0225 455/574 |
| 2015/0189574 | A1* | 7/2015 | Ng ........................ | H04W 24/08 370/252 |
| 2015/0256995 | A1* | 9/2015 | Rune ...................... | H04W 8/186 455/418 |
| 2016/0128006 | A1* | 5/2016 | Ji .......................... | H04W 48/14 370/350 |
| 2016/0234735 | A1* | 8/2016 | Kubota .................. | H04W 48/14 |
| 2016/0234736 | A1* | 8/2016 | Kubota ............ | H04W 36/0083 |
| 2016/0234759 | A1* | 8/2016 | Kubota ................... | H04W 48/14 |
| 2018/0146404 | A1* | 5/2018 | Zhang ................... | H04W 48/12 |
| 2018/0295612 | A1* | 10/2018 | Yi ............................ | H04B 7/26 |

FOREIGN PATENT DOCUMENTS

| | | | | |
|---|---|---|---|---|
| WO | WO-2009117895 A1 * | 10/2009 | ........... | H04B 7/2656 |
| WO | WO2012062169 A1 | 11/2010 | | |
| WO | WO-2012062169 A1 * | 5/2012 | ............ | H04W 48/12 |

OTHER PUBLICATIONS

International Search Report and Written Opinion of International Search Authority for PCT/CN2017/097062 dated Aug. 27, 2017 (12 pages).

3GPP TSG RAN WG2 Meeting #94 R2-163470, CATT, System information in NR, Nanjing, China dated May 23-27, 2016 (3 pages).

3GPP TSG-RAN WG2 Meeting #94 R2-163371, Samsung, "System Information Signalling Design in NR", Nanjing, China dated May 23-27, 2016 (7 pages).

* cited by examiner

SYSTEM INFORMATION ACQUISITION

CROSS REFERENCE TO RELATED APPLICATIONS

This application claims priority under 35 U.S.C. § 119 from U.S. Provisional Application No. 62/374,047, entitled "System Information Acquisition," filed on Aug. 12, 2016, the subject matter of which is incorporated herein by reference.

TECHNICAL FIELD

The disclosed embodiments relate generally to system information in mobile communication network, and, more particularly, to functionality for handling system and configuration information acquisition.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). A serving base station can communicate with a plurality of UEs in a serving cell via broadcasting, e.g., when UEs are in idle mode, or via dedicated unicasting, e.g., when UEs are in connected mode. In cellular networks, each serving cell periodically broadcasts its own system configuration-system information.

System information (SI) is information that is provided to users of a communication interface—user equipments (UEs). SI can include information that is needed before using the communication interface, information that is generally used by many users, and information that is suitable to be broadcast, e.g., used by users that are in idle mode. System information includes but is not limited to information that is provided by base stations or access points of a public land mobile network (PLMN), by transmission points, by beams, by cells, by cell portions, etc. System information could also be provided by other access points or by other UEs. The notation of UE also includes machine to machine communication scenarios, i.e., when there is no human user.

In current art, system information is acquired in each cell, where each cell repeatedly and always broadcasts system information. To work normally, UE should store and apply correct version of SI of its own serving cell. For the same SI type, different cells may have different configuration. In LTE, UE always re-acquire all SI types when it changes serving cell. However, periodic broadcast signaling increases inter-cell interference and thus limit the minimum cell distance and cell density. For high-frequency new systems, the concept of a piece of contiguous coverage is no longer a cell but instead a beam, which has very small coverage area. Periodic broadcasting overhead needs to be transmitted on multiple beam directions, resulting in multiple overhead.

5G new radio (NR) aims to reduce system information broadcast overhead. The potential of saving transmission in a higher frequency system by avoiding SI broadcasting is very large, especially at low traffic hours, when many beams will have zero active users, and the requirement for transmission of SI by broadcast is very low. Solutions to reduce SI broadcast overhead are sought.

SUMMARY

A method of system information (SI) acquisition with reduced signaling overhead is proposed. To reduce SI broadcast overhead, the quantity of periodic SI broadcast and the frequency of on-demand SI acquisition need to be reduced. In order to reduce the quantity of periodic SI broadcasting, on-demand SI delivery is enabled. With on-demand SI delivery, signaling overhead is proportional to the frequency of SI acquisition. From the network side, the base stations proactively provide SI delivery options and delivers SI over unicast or scheduled broadcast. From the UE side, UE determines how to acquire SI, i.e., by listening to broadcast or by sending an on-demand request via existing procedures such as a random-access procedure over a random-access channel (RACH).

In one embodiment, a user equipment (UE) receives a system information (SI) list from a base station (eNB) in a mobile communication network. The SI list refers to a plurality of SI information elements. The UE determines how to acquire an SI information element based on an indication from the SI list on how the SI information element can be acquired. The UE acquires the SI information element by broadcast reception when the indication indicates scheduled SI broadcasting. The UE acquires the SI information element by sending a request to the eNB via a random-access procedure when the indication indicates on-demand requesting.

In another embodiment, a base station (eNB) transmits a system information (SI) list by to a user equipment (UE) in a mobile communication network. The SI list refers to a plurality of SI information elements. The SI list comprises indications on how each SI information element is distributed to the UE. The eNB broadcasts a first SI information element to the UE when a first indication indicates scheduled SI broadcasting for the first SI information element. The eNB receives a request from the UE for acquiring a second SI information element when a second indication indicates on-demand requesting for the second SI information element, wherein the request is received via a random-access procedure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
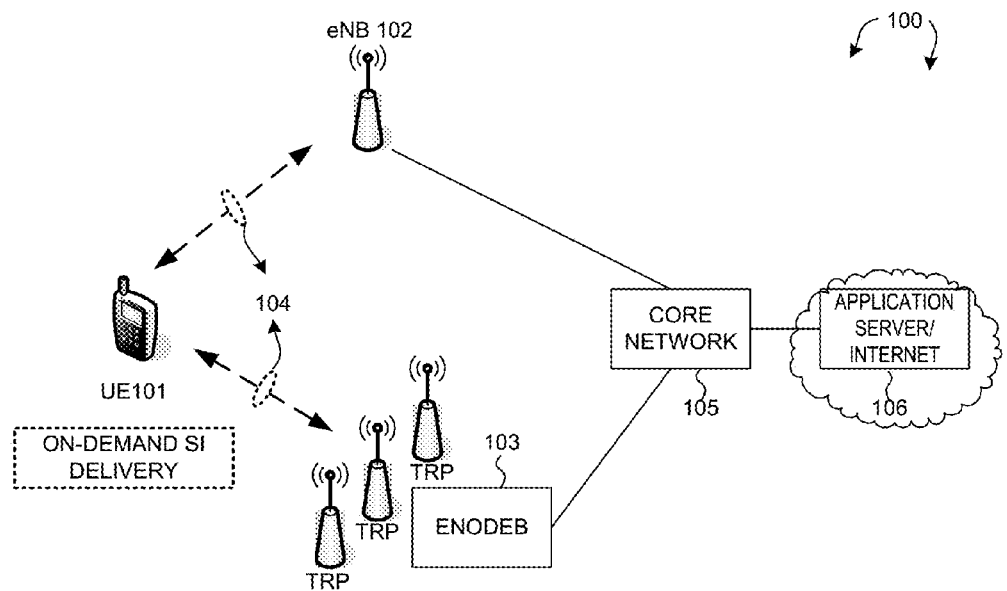
FIG. 1 illustrates a mobile communication network supporting system information acquisition with reduced signaling overhead in accordance with one novel aspect.

FIG. 1 illustrates a mobile communication network supporting system information acquisition with reduced signaling overhead in accordance with one novel aspect. Mobile communication network 100 comprises a user equipment UE 101, a first base station eNB 102, a second base station eNB 103, and a packet core network (CN) 105. The base stations communicate with each other via the X2 interface, and eNB 102/103 communicates with CN 105 via the S1 interface. UE 101 can access application servers and the Internet 106 over wireless link 104 with eNB 102/103 and CN 105. The eNBs can be implemented in traditional ways as eNB 102, or implemented to include multiple transmission points (TRPs) as eNB 103. The wireless link 104 may be specified as a cell, a cell portion, a TRP, a sidelink, or a beam in higher frequency systems.

LTE system information (SI) is one of the key aspects of the cellular air interface. SI consists of the Master Information Block (MIB) and a number of System Information Blocks (SIBs) including SIB1 to SIB11. SIB is also referred to as SI information element. MIB carries the most essential system information including the downlink channel bandwidth, the system frame number (SFN), physical HARQ indicator channel (PHICH) configuration, and the number of transmit antenna ports. MIB is sent on the Physical Broadcast Channel (PBCH) and is broadcasted every radio frame with a fixed periodicity of four radio frames. SIBs are sent on the Physical Downlink Shared Channel (PDSCH) through Radio Resource Control (RRC) messages at periodic intervals. For example, SIB1 is carried by "SystemInformationBlockType 1" message. SIB2 and other SIBs are carried by "SystemInformation (SI)" messages. An SI message can contain multiple SIBs. SIB1 carries information regarding whether UE is allowed to access the LTE cell and also defines the scheduling of the other SIBs. SIB2 carries common channels as well as shared channel information and also carries RRC, uplink power control, preamble power ramping etc. SIB3 carries cell re-selection information. SIB4-SIB11 carry other various types of system information.

In current art, system information is acquired in each cell, where each cell repeatedly and always broadcasts system information. To work normally, UE should store and apply correct version of SI of its own serving cell. For the same SI type, different cells may have different configuration. In LTE, UE always re-acquire all SI types when it changes serving cell. However, periodic broadcast signaling increases inter-cell interference and thus limit the minimum cell distance and cell density. For high-frequency new systems, the concept of a piece of contiguous coverage is no longer a cell but instead a beam, which has very small coverage area. Periodic broadcasting overhead needs to be transmitted on multiple beam directions, resulting in multiple overhead.

In accordance with one novel aspect, a method of system information (SI) acquisition with reduced signaling overhead is proposed. To reduce SI broadcast overhead, the quantity of periodic SI broadcast and the frequency of on-demand SI acquisition need to be reduced. In order to reduce the quantity of periodic SI broadcasting, on-demand SI delivery is enabled. With on-demand SI delivery, signaling overhead is proportional to the frequency of SI acquisition. From the network side, the base stations proactively provide SI delivery options and delivers SI over unicast or scheduled broadcast. From the UE side, UE determines how to acquire SI, i.e., by listening to broadcast or by sending an on-demand request via existing procedures such as a random-access procedure over a random-access channel (RACH).

In the example of FIG. 1, eNB 102 sends an SI list to UE 101, the SI list refers to a plurality of SI information elements that is applicable to the current SI ID. An SI ID is introduced to associated areas where a set of SI information elements is the same within one single SI ID. The SI list also indicates how each SI information element is distributed. Upon receiving the SI list, UE 101 determines how to acquire each SI information element, either by listening to broadcast or by sending an on-demand request via RACH procedure. In one example, UE 101 indicates the type of desired SI by sending the request on specific radio resources. In another example, UE 101 indicates the type of desired SI by explicitly requesting the SI information element.

Figure 2:
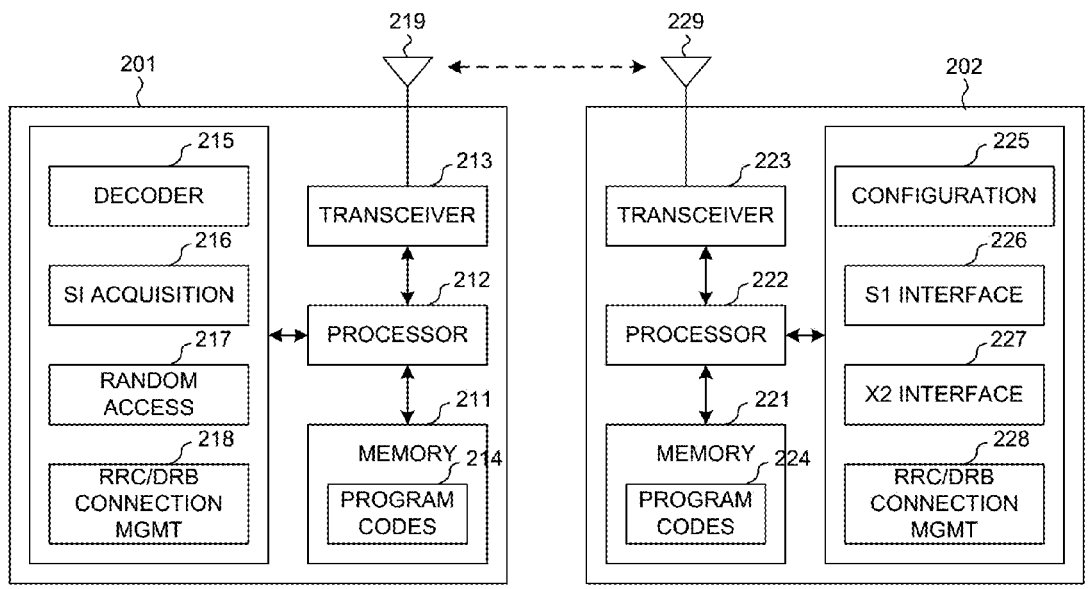
FIG. 2 is a simplified block diagram of a UE and an eNB that carry out certain embodiments of the present invention.

FIG. 2 is a simplified block diagram of a user equipment UE 201 and a base station eNodeB 202 that carry out certain embodiments of the present invention. User equipment UE 201 comprises memory 211 having program codes and data 214, a processor 212, a transceiver 213 coupled to an antenna module 219. RF transceiver module 213, coupled with the antenna, receives RF signals from the antenna, converts them to baseband signals and sends them to processor 212. RF transceiver 213 also converts received baseband signals from the processor, converts them to RF signals, and sends out to antenna 219. Processor 212 processes the received baseband signals and invokes different functional modules and circuits to perform different features and embodiments in UE 201. Memory 211 stores program instructions and data 214 to control the operations of UE 201.

User equipment UE 201 also comprises various function circuits and modules including a decoder 215 that decodes received configuration information, an SI acquisition circuit 216 that performs system information acquisition, a random-access handling circuit 217 that performs random access for cell search, cell selection, system information decoding and random access, and an RRC/DRB connection management and handling circuit 218 that performs RRC connection setup procedure and NAS setup procedure. The different circuits and modules are function circuits and modules that can be configured and implemented by software, firmware, hardware, or any combination thereof. For example, each circuit or module may comprise the processor 212 plus corresponding software codes. The function modules, when executed by the processors (e.g., via executing program codes 214 and 224), allow UE 201 and eNB 202 to perform system acquisition with reduced signaling overhead.

Similarly, base station eNodeB 202 comprises memory 221 having program codes and data 224, a processor 222, a transceiver 223 coupled to an antenna module 229. RF transceiver module 223, coupled with the antenna, receives RF signals from the antenna, converts them to baseband signals and sends them to processor 222. RF transceiver 223 also converts received baseband signals from the processor, converts them to RF signals, and sends out to antenna 229.

Processor 222 processes the received baseband signals and invokes different functional modules and circuits to perform different features and embodiments in eNodeB 202. Memory 221 stores program instructions and data 224 to control the operations of eNodeB 202. Base station eNodeB 202 also comprises various function circuits and modules including a configuration module 225 that provides various configuration including an SI list to UE 201, an S1 interface module 226 that manages communication with an MME in the core network, an X2 interface module 227 that manages communication with other base stations, and an RRC/DRB connection management and handling circuit 228 that performs RRC connection setup and NAS setup procedures and maintains RRC/DRB connection.

Figure 3:
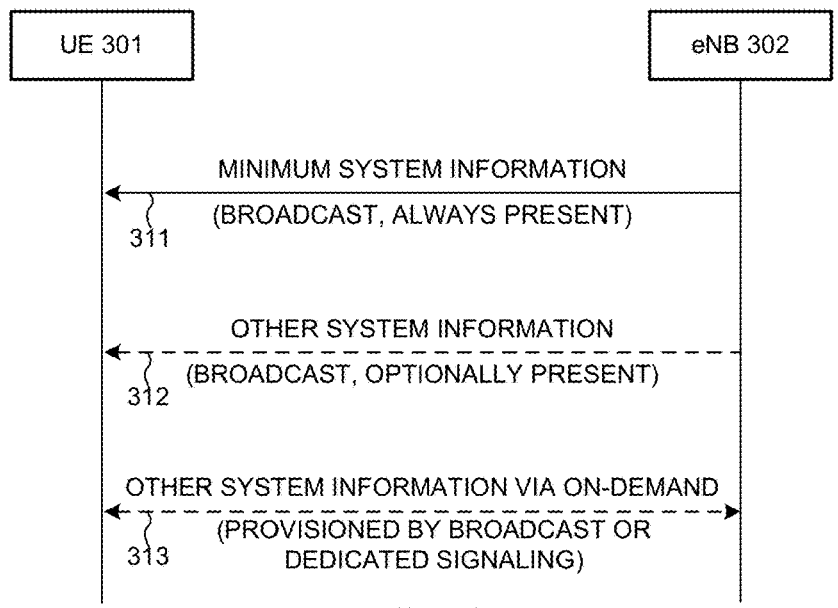
FIG. 3 illustrates system information handling in accordance with one novel aspect.

FIG. 3 illustrates system information handling in accordance with one novel aspect. System information is divided into minimum SI and other SI. Minimum SI is periodically broadcasted by the network. The minimum SI comprises basic information required for initial access to a cell and information for acquiring any other SI broadcast periodically or provisioned via on-demand basis, i.e. scheduling information. In one example, the minimum SI comprises the MIB and an SI list containing information for acquiring any other SI. The other SI encompasses everything not broadcast in the minimum SI. The other SI may either be broadcast, or provisioned in a dedicated manner, either triggered by the network or upon request from the UE, as depicted in FIG. 3. In step 311, UE 301 receives minimum system information broadcasted periodically by eNB 302, and is always present. In step 312, UE 301 receives other system information broadcasted periodically by eNB, and is optionally present. In step 313, UE 301 receives other system information via on-demand SI request, which is provisioned by broadcasting or dedicated signaling. Before UE 301 sends the other SI request, UE 301 needs to know whether the requested SI is available in the cell and whether the requested SI is broadcast or not.

Figure 4:
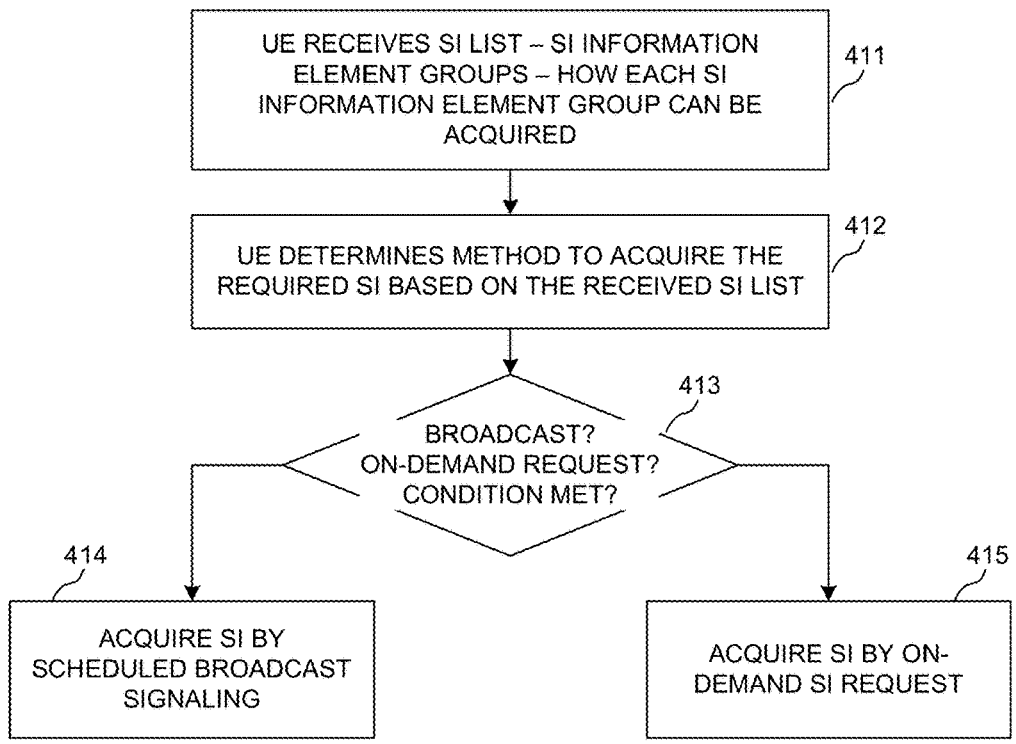
FIG. 4 illustrates a procedure for a UE to choose how to acquire system information based on SI list provided by a base station.

FIG. 4 illustrates a procedure for a UE to choose how to acquire system information based on SI list provided by a base station in accordance with one novel aspect. In step 411, the UE receives by signaling an SI list, referring to a plurality of SI information elements that is applicable to the current SI ID, cell, cell portion, TRP, beam, or sidelink. The SI list includes information on how an SI information element can be acquired. In step 412, the UE determines by which method of acquire the required SI, based on the received information for each SI information element contained in the SI list. In a first option #1, the SI information element is scheduled for SI broadcast. In a second option #2, the UE can explicitly request the SI information element on-demand. In a third option, both option #1 and option #2 are applicable. In step 413, the UE determines which option is applicable for the required SI information element. If option #1 is applicable, then the UE goes to step 414 and acquires SI by receiving scheduled broadcast signaling. If option #2 is applicable, then the UE goes to step 415 and acquires SI by sending an on-demand SI request. In general, if the SI list indicates that a SIB is not broadcasted, then the UE does not assume that this SIB is periodically broadcasted, therefore the UE may send an SI request to receive this SIB. For example, the SI list indicates that SIB1-SIB3 are scheduled to be broadcasted with corresponding scheduling information, and SIB4-SIB11 will not be broadcasted periodically. As a result, the UE will acquire SIB1-SIB3 via broadcasting reception, and will acquire SIB-SIB11 via on-demand requesting.

If both option #1 and option #2 are application, then a number of conditions are proposed, and the UE should only request the required SI information elements if at least one of the conditions is satisfied. The conditions include: is the UE configured to explicitly request SI? Is the UE running an application with certain quality of service (QoS) requirements? Is the required SI specified to be explicitly requested? Has the UE failed to acquire the SI by broadcast reception? Does the UE receive signal strength/quality below a certain threshold? (Note that a specific threshold can be broadcasted, or related to a threshold used for RACH or paging configurations.) Has the UE not been able to receive broadcasted SI for a number of SI cycles? Is the UE not configured to be delay tolerant? In general, if the answer to all of the above questions is no, then the UE goes to step 414 and acquires SI by scheduled broadcast signaling. If the answer to one of the above questions is yes, then the UE goes to step 415 and acquires SI by on-demand SI request. The above conditions are proposed such that it should be possible to schedule SI sparse with low overhead, but it should anyway be possible to achieve good QoS for UEs that require it, by utilizing on-demand distribution of SI.

If on-demand SI request is needed, for UEs in RRC_CONNECTED mode, dedicated RRC signaling can be used for the request and the delivery of the requested SI. For UEs in RRC_IDLE mode or RRC_INACTIVE mode, they should be able to request on-demand SI without requiring a state transition. The on-demand SI request may be sent by re-using an existing access procedure, e.g., a random-access procedure over a random-access channel (RACH). The SI response may be broadcast at configurable periodicity and for certain duration. It is network decision whether the SI response is broadcast or delivered through dedicated UE specific RRC signaling.

Figure 5:
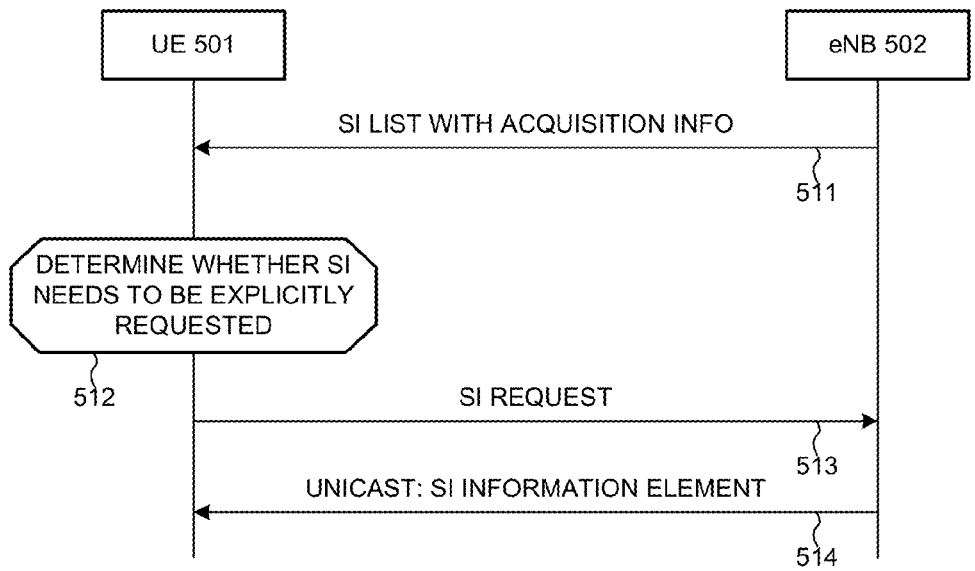
FIG. 5 illustrates a first embodiment of acquiring system information by explicit SI request in accordance with one novel aspect.

FIG. 5 illustrates a first embodiment of acquiring system information by explicit SI request in accordance with one novel aspect. In step 511, eNB 502 transmits an SI list with SI acquisition information to UE 501. The SI list refers to a plurality of SI information elements, and indications on how the UE can acquire each SI information element. In step 512, upon receiving the SI list, UE 501 determines whether a required SI information element needs to be explicitly requested on-demand. If on-demand SI request is needed, then in step 513, UE 501 may trigger a RACH procedure to send the SI request.

A typical RACH procedure involves four steps: 1) MSG1—where UE can send a preamble (e.g., an SI request) over a RACH resource; 2) MSG2—where eNB can send an acknowledgement to UE's SI request in MSG1; 3) MSG3—where UE can send an SI request; and 4) MSG4—where eNB can send an acknowledgement to UE's SI request in MSG3. The network can control whether MSG1 or MSG3 can be used to transmit the SI request. If the PRACH preamble and/or PRACH resource specific to each SIB or set of SIBs which the UE needs to acquire is included in minimum SI, then the SI request is indicated using MSG1. If the PRACH preamble and/or PRACH resource specific to each SIB or set of SIBs which the UE needs to acquire is not included in minimum SI, then the SI request is included in MSG3. The network can also control whether the SI response is broadcast or delivered through dedicated UE specific RRC signaling. In the example of FIG. 5, in step 513, UE 501 sends the SI request using MSG1 or MSG3. In step 514, eNB 502 sends an immediate response to the request, with the SI information element delivered back to UE 501 via unicast/broadcast. Specifically, for UEs in connected mode, dedicated RRC signaling can be used for the request and delivery for the SI information element.

Figure 6:
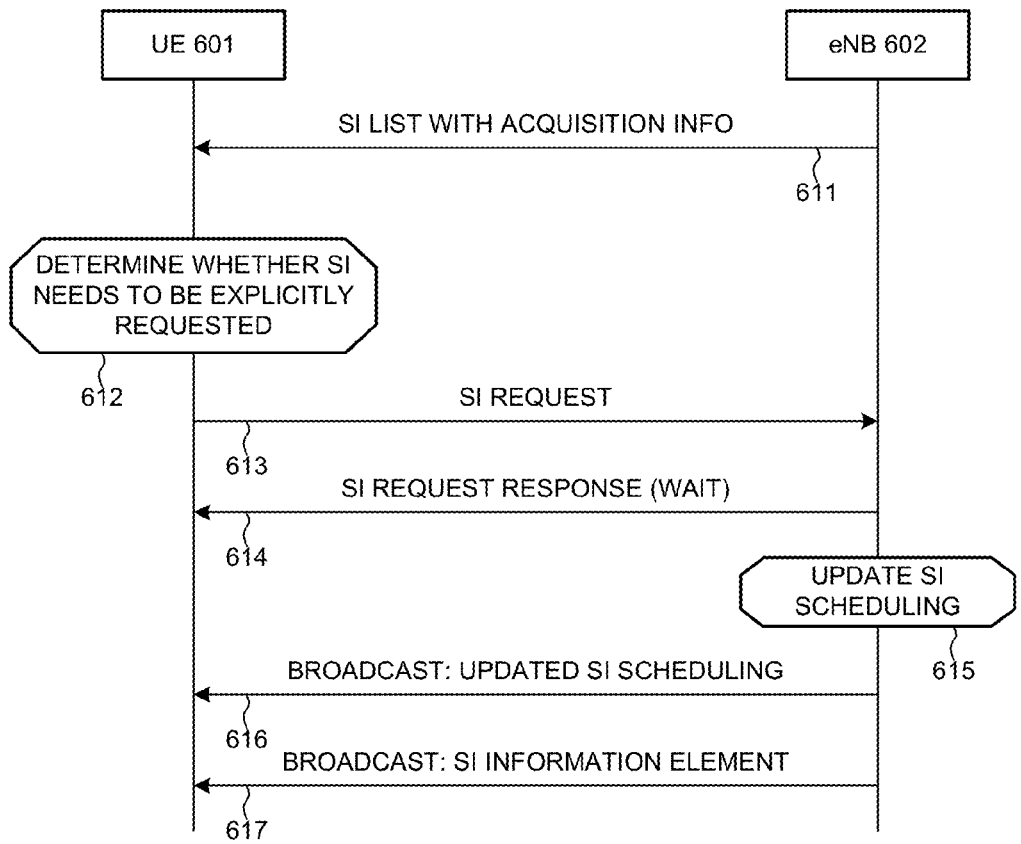
FIG. 6 illustrates a second embodiment of acquiring system information by explicit SI request in accordance with one novel aspect.

FIG. 6 illustrates a second embodiment of acquiring system information by explicit SI request in accordance with one novel aspect. In this embodiment, steps 611 and 612 are the same as steps 511 and 512 in FIG. 5. If on-demand SI request is needed, then in step 613, UE 601 may trigger a RACH procedure to send the SI request. For example, UE 601 needs SIB4, which is not broadcasted in the minimum SI and not indicated with scheduled broadcast. In step 613, UE 601 sends the SI request for SIB4 using MSG1 or MSG3. In step 614, eNB 602 sends a short SI response to UE 601 immediately in response to the SI request, instructs the UE to wait for broadcast distribution of the requested SIB4. In step 615, the SI scheduling is updated by the network, e.g., SIB4 is added for scheduled SI broadcasting. In step 616, UE 601 is informed with the updated scheduling. In step 617, the SI information element (SIB4) is provided by the regular system information broadcast mechanism according to the updated scheduling.

Figure 7:
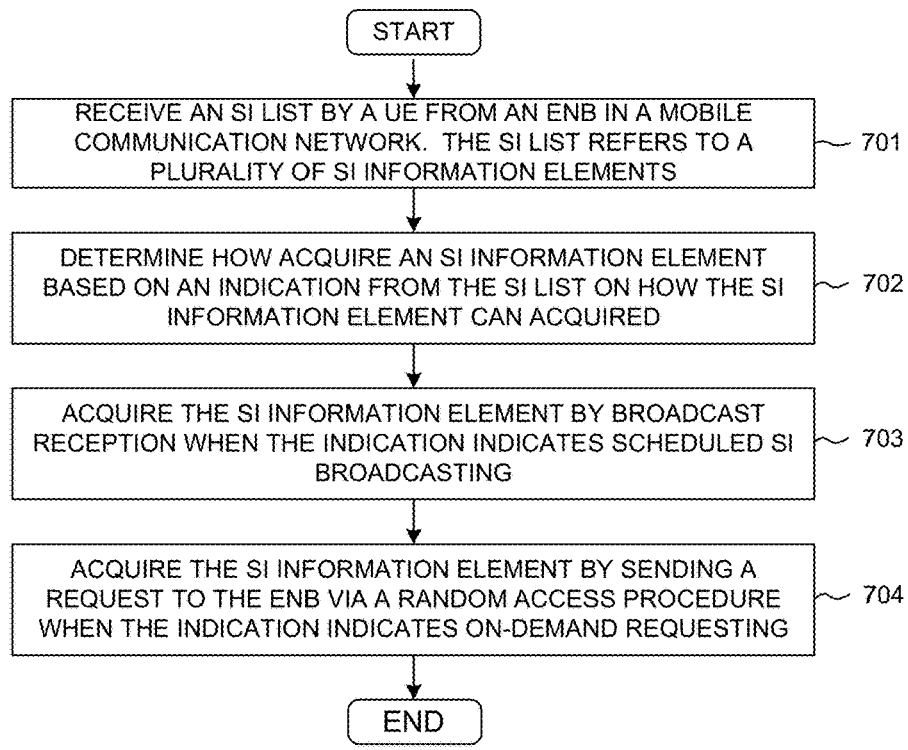
FIG. 7 is a flow chart of a method of acquiring system information from UE perspective in accordance with one novel aspect.

FIG. 7 is a flow chart of a method of acquiring system information from UE perspective in accordance with one novel aspect. In step 701, a user equipment (UE) receives a system information (SI) list from a base station (eNB) in a mobile communication network. The SI list refers to a plurality of SI information elements. In step 702, the UE determines how to acquire an SI information element based on an indication from the SI list on how the SI information element can be acquired. In step 703, the UE acquires the SI information element by broadcast reception when the indication indicates scheduled SI broadcasting. In step 704, the UE acquires the SI information element by sending a request to the eNB via a random-access procedure when the indication indicates on-demand requesting.

Figure 8:
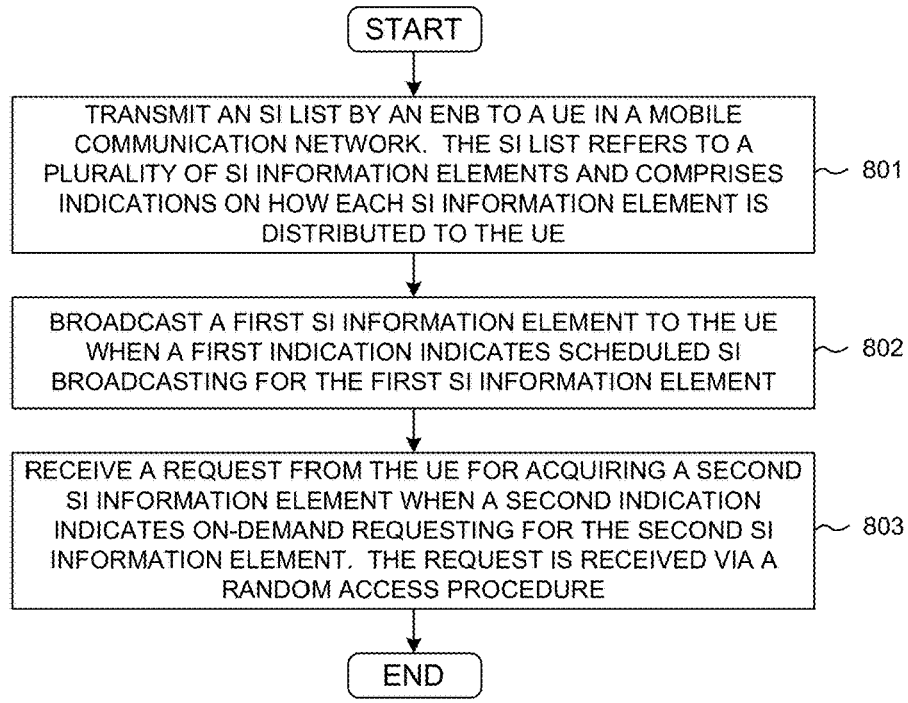
FIG. 8 is a flow chart of a method of acquiring system information from eNB perspective in accordance with one novel aspect.

FIG. 8 is a flow chart of a method of acquiring system information from eNB perspective in accordance with one novel aspect. In step 801, a base station (eNB) transmits a system information (SI) list by to a user equipment (UE) in a mobile communication network. The SI list refers to a plurality of SI information elements. The SI list comprises indications on how each SI information element is distributed to the UE. In step 802 the eNB broadcasts a first SI information element to the UE when a first indication indicates scheduled SI broadcasting for the first SI information element. In step 803, the eNB receives a request from the UE for acquiring a second SI information element when a second indication indicates on-demand requesting for the second SI information element, wherein the request is received via a random-access procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a system information (SI) list by a user equipment (UE) from a base station in a mobile communication network, wherein the SI list refers to a plurality of SI information elements;
   determining how to acquire an SI information element based on an indication from the SI list on how the SI information element can be acquired;
   acquiring the SI information element by broadcast reception when the indication indicates scheduled SI broadcasting; and
   acquiring the SI information element by sending a request to the base station via a random-access procedure when the indication indicates on-demand requesting.

2. The method of claim 1, wherein the UE sends the request upon satisfying at least one of the conditions comprising: the UE is configured or authorized, the UE has an application running, the UE has failed to acquire SI by broadcast reception, the UE has not been able to receive broadcasted SI for a number of SI cycles, and the UE has a received signal strength below a threshold.

3. The method of claim 1, wherein the request is sent over specific radio access resource that is implicitly associated with the SI information element.

4. The method of claim 1, wherein the request is sent by the UE to the base station explicitly requesting for the SI information element.

5. The method of claim 1, further comprising:
   receiving content of the SI information element over a unicast signaling from the base station in response to the random-access procedure.

6. The method of claim 1, further comprising:
   receiving an immediate response indicating SI broadcasting from the base station in response to the random-access procedure; and
   receiving content of the SI information element over a broadcast signaling based on an updated scheduling for SI broadcasting.

7. A user equipment (UE), comprising:
   a receiver that receives a system information (SI) list from a base station in a mobile communication network, wherein the SI list refers to a plurality of SI information elements;
   an SI acquisition circuit that determines how to acquire an SI information element based on an indication on how the SI information element can be acquired; and
   a decoder that decodes the indication from the SI list and thereby acquiring the SI information element by broadcast reception when the indication indicates scheduled SI broadcasting, and thereby acquiring the SI information element by sending a request to the base station via a random-access procedure when the indication indicates on-demand requesting.

8. The UE of claim 7, wherein the UE sends the request upon satisfying at least one of the conditions comprising: the UE is configured or authorized, the UE has an application running, the UE has failed to acquire SI by broadcast reception, the UE has not been able to receive broadcasted SI for a number of SI cycles, and the UE has a received signal strength below a threshold.

9. The UE of claim 7, wherein the request is sent over specific radio access resource that is implicitly associated with the SI information element.

10. The UE of claim 7, wherein the request is sent by the UE to the base station explicitly requesting for the SI information element.

11. The UE of claim 7, wherein the UE receives content of the SI information element over a unicast signaling from the base station in response to the random-access procedure.

12. The UE of claim 7, wherein the UE receives an immediate response indicating SI broadcasting from the base station in response to the random-access procedure, and wherein the UE receives content of the SI information element over a broadcast signaling based on an updated scheduling for SI broadcasting.

13. A method, comprising:

transmitting a system information (SI) list by a base station to a user equipment (UE) in a mobile communication network, wherein the SI list refers to a plurality of SI information elements, wherein the SI list comprises indications on how each SI information element is distributed to the UE;

broadcasting a first SI information element to the UE when a first indication indicates scheduled SI broadcasting for the first SI information element; and receiving a request from the UE for acquiring a second SI information element when a second indication indicates on-demand requesting for the second SI information element, wherein the request is received via a random-access procedure.

14. The method of claim 13, wherein the request is received upon satisfying at least one of the conditions comprising: the UE is configured or authorized, the UE has an application running, the UE has failed to acquire SI by broadcast reception, the UE has not been able to receive broadcasted SI for a number of SI cycles, and the UE has a received signal strength below a threshold.

15. The method of claim 13, wherein the base station receives the request over specific radio access resource that is implicitly associated with the SI information element.

16. The method of claim 1, wherein base station receives the request from the UE that explicitly requesting for the SI information element.

17. The method of claim 13, further comprising:

transmitting content of the SI information element over a unicast signaling in response to the random-access procedure.

18. The method of claim 13, further comprising:

transmitting an immediate response indicating SI broadcasting in response to the random-access procedure; and transmitting content of the SI information element over a broadcast signaling based on an updated scheduling for SI broadcasting.

19. The method of claim 13, wherein the base station transmits SI broadcasting scheduling information to the UE.

20. The method of claim 13, wherein the SI list is applicable to a current SI ID, and wherein the base station provides other SI information elements that is applicable to another SI ID as requested by the UE.

* * * * *